United States Patent [19]

Pooley et al.

[11] 3,743,837

[45] July 3, 1973

[54] PHOTOTRANSISTOR AUTOMATIC GAIN CONTROL

[75] Inventors: Charles Kent Pooley, Santa Monica; Edward Dillingham, Pacific Palisades, both of Calif.

[73] Assignee: Data Source Corporation, El Segundo, Calif.

[22] Filed: Jan. 20, 1972

[21] Appl. No.: 219,460

[52] U.S. Cl. ............ 250/206, 250/214 R, 307/117, 330/97

[51] Int. Cl. ............ H01j 39/12

[58] Field of Search ............ 250/206, 214 R; 307/311, 117; 330/97

[56] References Cited

UNITED STATES PATENTS

| | | | |
|---|---|---|---|
| 3,519,828 | 7/1970 | Milford | 250/214 R |
| 3,408,578 | 10/1968 | Smith | 250/214 R |
| 3,328,590 | 6/1967 | Kapsambelis | 250/206 X |
| 3,626,825 | 12/1971 | Years | 250/211 J |

*Primary Examiner*—Walter Stolwein
*Attorney*—Seidel, Gonda & Goldhammer

[57] ABSTRACT

A phototransistor automatic gain control circuit for compensating for variations in intensity of radiation impinging upon the phototransistor. The phototransistor is operated in the knee portion of its characteristic curve. The voltage across the phototransistor is varied in order to vary the gain of the phototransistor to compensate for variations in intensity of the radiation.

11 Claims, 2 Drawing Figures

PHOTOTRANSISTOR AUTOMATIC GAIN CONTROL

This invention relates to a phototransistor automatic gain control. More particularly, the present invention relates to a phototransistor automatic gain control circuit in which the voltage across the emitter-collector circuit of a phototransistor is varied in order to vary the gain to compensate for variations in intensity of radiation impinging upon the phototransistor.

The present invention is directed to a circuit for compensating for variations in light intensity or radiation impinging upon a photodetector. In other words, the circuit tends to maintain a constant output even though the light or radiation impinging upon the photodetector varies widely in intensity. Photodetector circuits have found wide use in testing and control circuitry. For example, photodetector circuits are used in apparatus varying from yarn uniformity detectors to control circuitry for controlling the tape transport deck on large instrumentation magnetic tape recorders.

The present invention is particularly well suited for use in apparatus for optically reading symbols embossed on credit cards. In such credit card reading apparatus, the credit card is passed under a plurality of pairs of optic fibers. One of each pair of optic fibers transmits light from a light source, and the other optic fiber of the pair transmits light reflected from the credit card to a photodetector. When an embossed portion of a symbol on a credit card is under a pair of optic fibers, the light is reflected from the credit card in such a direction as to miss the optic fiber which transmits light to the photodetector. In such a card reading system, it is desirable to produce a uniform output when light is reflected into the second optic fiber independent of variables such as the color of the credit card, temperature, intensity of the light source and other variables. It is also desired that photodetector circuit produce a second uniform and distinct level output when reflection from the credit card misses the second optic fiber of the pair.

The present invention is directed to an automatic gain control circuit for a phototransistor which will compensate for variations such as temperature, color of the credit card, variations in light source intensity, variations in read head quality such as slight misalignment of optic fibers and variations in phototransistor characteristics due to manufacturing tolerances. Variations in phototransistor characteristics due to manufacturing tolerances may be one of the largest and most important variables compensated for. For example, the temperature of the apparatus may be controlled by expensive air conditioning equipment. The optic fibers may be accurately aligned by expensive and tedious adjustments. However, the characteristics of the phototransistor and the color of the credit card are not as easily corrected by other means. With respect to the credit card color, it is assumed that the credit card reading apparatus would be reading credit cards of various companies which usually have their own distinctive coloring and marking such as trade names painted thereon.

Various circuits are known in the prior art for linearizing the outputs of photocells. Some of these circuits supply a negative feedback voltage proportional to the output signal to the photocell either in series with the supply of the photocell or to a grid of the cell. However, the present invention is not directed to a circuit for producing a linearized output from a photodetector. In other words, the present invention is not directed to a circuit which will produce an output which varies linearly with an increasing or decreasing radiation intensity. The present invention is directed to a circuit for maintaining a relatively constant output for a widely varying radiation intensity.

Briefly, the present invention uses an amplifier means to detect variations in voltage across a phototransistor. The amplifier supplies a charge to a capacitor through a diode. The capacitor is connected in series with the emitter-collector circuit of the phototransistor and varies the potential across the emitter-collector circuit of the phototransistor in order to adjust the gain of the phototransistor. The amplifier means may be provided with a negative feedback path. A trigger circuit means is also provided for producing a pulse output.

For the purpose of illustrating the invention, there are shown in the drawings forms which are presently preferred; it being understood, however, that this invention is not limited to the precise arrangements and instrumentalities shown.

Figure 1:
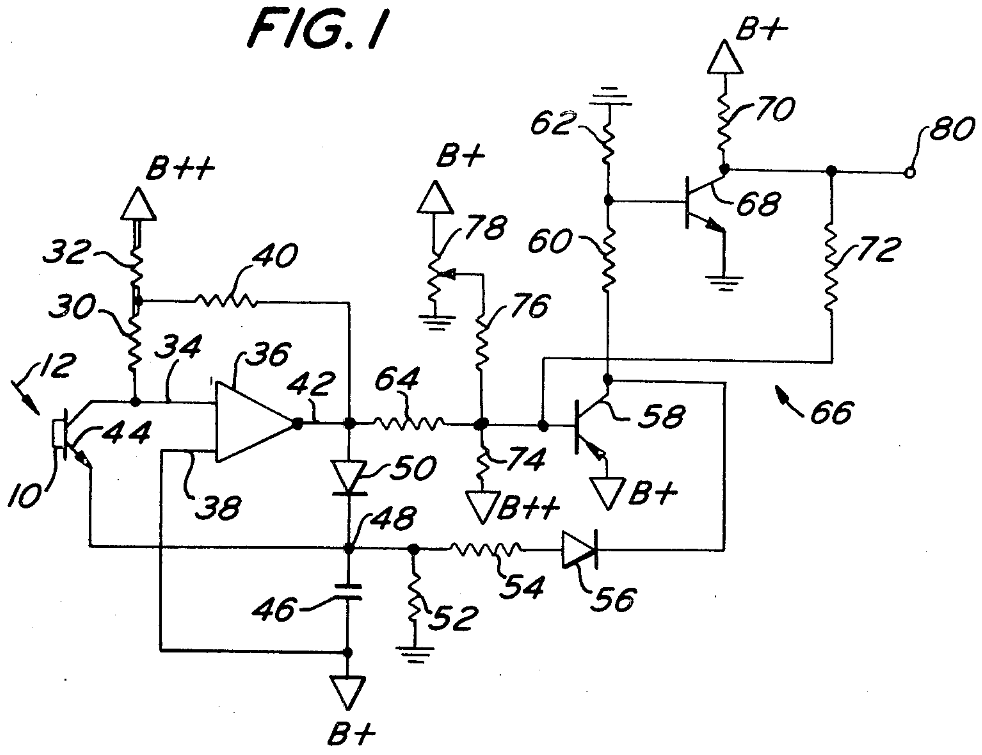
FIG. 1 is a schematic view of a circuit in accordance with the present invention.
Figure 2:
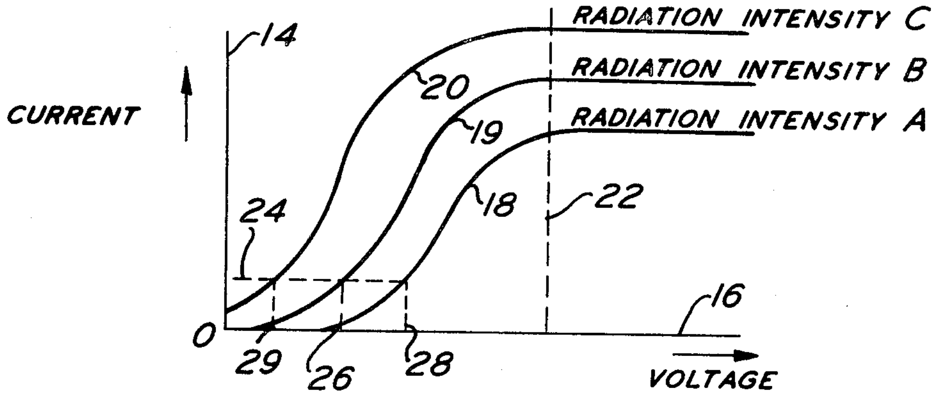
FIG. 2 is a representative diagram of some characteristic curves of a phototransistor used in practicing the present invention.

Referring now to the drawings in detail, there is shown in FIG. 1 a schematic of a phototransistor automatic gain control circuit in which phototransistor 10 is irradiated by radiation shown by arrow 12. The collector current of phototransistor 10 varies with the intensity of radiation 12 on phototransistor 10. Radiation of the base zone of phototransistor 10 sets charge carriers free which in turn causes collector-emitter current. Typical characteristic curves of phototransistor 10 are shown in FIG. 2. In FIG. 2, phototransistor emitter-collector current is shown along the ordinate 14. Emitter-collector potential or voltage of phototransistor 10 is shown along abscissa 16. Characteristic curves 18–20 are shown which correspond to radiation intensities A-C, respectively, with radiation intensity C being greater than radiation intensity B, and radiation intensity B being greater than radiation intensity A. The normal operation of a phototransistor is to the right of dotted line 22 which provides a relatively linear output current with respect to radiation intensity. Phototransistor 10 is operated in the knee region of the characteristic curve which is in the area of dotted lines 24 and 26.

Returning now to FIG. 1, the collector of photocell 10 is connected through resistors 30 and 32 to B++. B++may be a positive supply voltage having a potential in excess of that of positive supply B+. However, it is understood that the polarity of the supply voltages could be reversed by using PNP transistors instead of NPN transistors and vice versa and by reversing the polarity of the diodes. The collector of phototransistor 10 is also connected to input 34 of amplifier means 36. Amplifier means 36 may be an operational amplifier with input terminal 34 being the inverting input terminal. The non-inverting input terminal 38 may be connected to B+ or to some other reference potential. Resistor 40 provides a negative feedback path between output terminal 42 of operational amplifier 36 and input terminal 34 through resistor 30.

The emitter 44 of phototransistor 10 is connected to one terminal of capacitor 46 at point 48. The other terminal of capacitor 46 is connected to B+. Diode 50 is connected between the output 42 of operational amplifier 36 and point 48. Also connected between point 48 and ground is a resistor 52. Resistor 52 is of a large resistance which may be 4 to 5 megohms. Resistor 54 is connected between point 48 and diode 56. Resistor 54 is of a much smaller magnitude of resistance than resistor 52. However, it is understood that large impedances may be used in place of resistances 52 and 54. The cathode of diode 56 is connected to the collector of transistor 58 which is in turn connected to ground through resistors 60 and 62.

The output at output terminal 42 of operational amplifier 36 is fed through resistor 64 to a trigger circuit means 66 comprised of transistors 58 and 68. Transistors 58 and 68 comprise a Schmitt trigger circuit, which is well known in the art. The emitter of transistor 58 is connected to B+. The emitter of transistor 68 is connected to ground and the collector of transistor 68 is connected to B+ through resistor 70. Resistor 72 provides a positive feedback from the collector of transistor 68 to the base of transistor 58 in order to ensure rapid switching action. The base of transistor 58 is connected to B++ through resistor 74 and is connected through resistor 76 to the wiper arm of potentiometer 78 connected between B+ and ground in order to provide an adjustable potential for varying the level of the output signal of operational amplifier 36 which will trigger trigger circuit means 66.

In operation, assuming phototransistor 10 is illuminated or irradiated, phototransistor 10 will be conducting thereby producing a less positive or more negative signal on input 34 of operational amplifier 36 than when phototransistor 10 is not conducting. This negative signal, relatively speaking, on input 34 of operational amplifier 36 will produce a positive signal on output 42. This positive level on output 42 of operational amplifier 36 will cause capacitor 46 to be charged through diode 50. The charge on capacitor 46 makes point 48 more positive. This increase in positive potential at point 48 decreases the potential across the emitter-collector of phototransistor 10. Also, the negative feedback path between the output 42 and the input 34 through resistors 40 and 30 of operational amplifier 36, prevents overshoot in operation and tends to raise the potential of input 34 to the potential of input 38 which is connected to B+. The operating point of phototransistor 10 may be illustrated as the intersection of dotted lines 24 and 26 in FIG. 2. The positive potential on output 42 of operational amplifier 36 is applied through resistor 64 to the base of transistor 58. This positive potential cuts off transistor 58. Transistor 58 in turn applies a low potential to the base of transistor 68 causing transistor 68 to be cut off. The output at output terminal 80 is therefore approximately equal to B+ which may be 5 volts.

Assuming a decrease in radiation intensity, the current through phototransistor 10 will tend to decrease. This causes a rise in potential at inverting input terminal 34 of operational amplifier 36. This results in a decrease in potential at output terminal 42 of operational amplifier 36. Diode 50 is turned off due to the decrease in potential at output terminal 42. Capacitor 46 will therefore discharge through resistor 54, diode 56 and resistors 60 and 62 since this is a lower impedance or resistance path than through resistor 52. Discharging of capacitor 46 causes an increase in the potential across the emitter-collector terminals of phototransistor 10. This increase in potential across the emitter-collector terminals of phototransistor 10 may be illustrated in FIG. 2 by an operating point at the intersection of dotted lines 24 and 28. It is therefore seen on FIG. 2, that an increase in the potential across the emitter-collector of phototransistor 10 maintains a constant current output as shown by dotted line 24 even though the intensity of the radiation impinging upon phototransistor 10 has decreased.

Assuming, that phototransistor 10 is completely unradiated, as for example when the light hits an embossment on a credit card and is reflected in a direction other than that of the second optic fiber, there is a relatively large increase in the potential on input 34 of operational amplifier 36. This results in a relatively large decrease in potential on output terminal 42 which causes transistor 58 to conduct. Conduction of transistor 58 raises the potential at the cathode of diode 56 and at the base of transistor 68. This causes diode 56 to cut off and transistor 68 to conduct. A relatively low potential, near ground, is felt on output terminal 80 when transistor 68 conducts. The back biasing or cutting off of diode 56 prevents a rapid discharge of capacitor 46. Capacitor 46 may discharge slowly through resistor 52. However, during normal pulse operation, capacitor 46 will not substantially discharge.

Assuming normal operation depicted in FIG. 2 at the intersection of dotted lines 24 and 26 and an increase in radiation corresponding to characteristic curve 20, the current through phototransistor 10 will increase. This will cause a decrease in the potential at input terminal 34 of operational amplifier 36 and an increase in the output potential at output terminal 42. The increase in potential at output terminal 42 of operational amplifier 36 will cause further charging of capacitor 46 through diode 50. This will cause a rise in potential at point 48. The rise in potential at point 48 will cause a decrease in the potential across phototransistor 10. The new operating point of phototransistor 10 would be depicted by the intersection of the lines 24 and 29 in FIG. 2. It is noted that the current through phototransistor 10 has been maintained relatively constant even though there have been wide variations in the intensity of radiation impinging upon phototransistor 10.

The present invention may be embodied in other specific forms without departing from the spirit or essential attributes thereof and, accordingly, reference should be made to the appended claims, rather than to the foregoing specification as indicating the scope of the invention.

We claim:

1. An automatic gain control circuit for adjusting the gain of a phototransistor circuit for producing a digital output signal indicative of an illuminated or unilluminated condition, comprising:

a phototransistor having a first terminal and a second terminal;

means for biasing said phototransistor in the knee region of the characteristic curve of said phototransistor;

means for detecting a change in current through said phototransistor;

amplifier means having an output, said amplifier means amplifying a change in current through said phototransistor detected by said detecting means;

a capacitance connected in series with said first and second terminals between two predetermined potentials;

a diode connected between said capacitance and said output of said amplifier means, said diode being poled so as to allow charging of said capacitance when an increase in current flow through said phototransistor occurs, thereby decreasing the potential across said first and second terminals of said phototransistor.

2. An automatic gain control circuit for adjusting the gain of a phototransistor as recited in claim 1 wherein said amplifier means is provided with a negative feedback path.

3. An automatic gain control circuit for adjusting the gain of a phototransistor as recited in claim 1 wherein said output of said amplifier means is applied to a trigger circuit means.

4. An automatic gain control circuit for adjusting the gain of a phototransistor as recited in claim 3 wherein said trigger circuit means is provided with an adjustable potential for varying the level of output signal of said amplifier means at which said trigger circuit means produces an output pulse.

5. An automatic gain control circuit for adjusting the gain of a phototransistor as recited in claim 4 wherein said capacitance is provided with a high impedance discharge path and a low impedance discharge path, said low impedance discharge path being provided with a second diode connected in series with said low impedance discharge path and poled so as to allow discharge of said capacitance when forward biased, one end of said second diode being connected to said trigger circuit means to reverse bias said second diode and prevent rapid discharge of said capacitance when said trigger circuit means is triggered.

6. An automatic gain control circuit for adjusting the gain of a phototransistor circuit for producing a digital output signal indicative of an illuminated or unilluminated condition, comprising:

a phototransistor having an emitter and a collector, said collector being connected through a resistance to a first predetermined potential, said phototransistor being biased in the knee region of the characteristic curve of said phototransistor, said phototransistor being responsive to radiation impinging thereon;

amplifier means having a first input, a second input and an output, said collector of said phototransistor being connected to said first input of said amplifier means, said second input of said amplifier means being connected to a second predetermined potential;

a capacitance connected between said emitter of said phototransistor and a third predetermined potential;

a diode connected between said output of said amplifier means and said emitter of said phototransistor, said diode being poled so as to allow charging of said capacitor in a polarity to decrease the potential across said phototransistor upon an increase in intensity of radiation impinging upon said phototransistor.

7. An automatic gain control circuit for adjusting the gain of a phototransistor as recited in claim 6 wherein said amplifier means is provided with a feedback circuit connected between said first input and said second input thereby causing said first input to tend toward said second predetermined potential on said second input of said amplifier means.

8. An automatic gain control circuit for adjusting the gain of a phototransistor as recited in claim 6 wherein said second predetermined potential equals said third predetermined potential.

9. An automatic gain control circuit for adjusting the gain of a phototransistor as recited in claim 6 wherein said output of said amplifier means provides an output signal to an input of a trigger circuit means, said input of said trigger circuit means being provided with an adjustable potential for varying the level of output signal of said amplifier means at which said trigger circuit means produces an output pulse.

10. An automatic gain control circuit for adjusting the gain of a phototransistor as recited in claim 6 wherein said amplifier means comprises an operational amplifier and wherein said first input is an inverting input of said operational amplifier.

11. An automatic gain control circuit for adjusting the gain of a phototransistor as recited in claim 9 including a high impedance discharge path and a low impedance discharge path for said capacitance, said low impedance discharge path being provided with a second diode connected in series with said low impedance discharge path and poled so as to allow discharge of said capacitance when forward biased, one end of said second diode being connected to said trigger circuit means to reverse bias said second diode and to prevent rapid discharge to said capacitance when said trigger circuit means is triggered.

* * * * *

UNITED STATES PATENT OFFICE
CERTIFICATE OF CORRECTION

Patent No. 3,743,837 Dated May 2, 1974

Inventor(s) Charles Kent Pooley and Edward Dillingham

It is certified that error appears in the above-identified patent and that said Letters Patent are hereby corrected as shown below:

In the Claims, Claim 1, Column 5, line 5, cancel "a diode" and substitute therefor--means--; Claim 1, Column 5, line 6, cancel "diode" and substitute therefor--means--; Claim 1, Column 5, line 7, cancel "poled so as" and substitute therefor--operative--; Claim 5, Column 5, lines 31, 34 and 35, cancel "second", each occurrence. Claim 6, Column 6, line 7, cancel "a diode" and substitute therefor--means--; Claim 6, Column 6, line 9, cancel "diode" and substitute therefor--means--, and cancel "poled so as" and substitute therefor--operative--; Claim 11, Column 6, line 43, cancel "sec-"; Claim 11, Column 6, line 44, cancel "ond"; Claim 11, Column 6, lines 47 and 48, cancel "second", each occurrence.

Signed and sealed this 20th day of August 1974.

(SEAL)
Attest:

McCOY M. GIBSON,
Attesting Officer

C. MARSHALL DANN
Commissioner of Patents